(12) United States Patent
McBride

(10) Patent No.: US 9,085,332 B2
(45) Date of Patent: Jul. 21, 2015

(54) TRAILER SIDE BOARD SUPPORT BRACKETS

(71) Applicant: James A. McBride, Hodgenville, KY (US)

(72) Inventor: James A. McBride, Hodgenville, KY (US)

( * ) Notice: Subject to any disclaimer, the term of this patent is extended or adjusted under 35 U.S.C. 154(b) by 0 days.

(21) Appl. No.: 13/999,497

(22) Filed: Mar. 4, 2014

(65) Prior Publication Data

US 2014/0284956 A1    Sep. 25, 2014

Related U.S. Application Data

(60) Provisional application No. 61/851,263, filed on Mar. 4, 2013.

(51) Int. Cl.
*B62D 33/023* (2006.01)
*B62D 33/033* (2006.01)

(52) U.S. Cl.
CPC ................... *B62D 33/023* (2013.01)

(58) Field of Classification Search
CPC ............. B62D 33/023; B62D 33/033; B62D 33/0222; B62D 33/0207; B62D 33/02
USPC ............... 296/3, 10, 36, 182.1, 186.4, 186.5, 296/186.1; 280/789, 656
See application file for complete search history.

(56) References Cited

U.S. PATENT DOCUMENTS

| | | | |
|---|---|---|---|
| 2,697,631 A | 12/1954 | Miller | |
| 3,623,744 A * | 11/1971 | Bertness et al. | 280/785 |
| 3,692,354 A * | 9/1972 | Tuerk | 296/36 |
| 4,035,015 A * | 7/1977 | Smith | 296/183.1 |
| 4,067,601 A * | 1/1978 | Tuerk | 296/36 |
| 4,767,150 A | 8/1988 | Hall | |
| 5,044,848 A | 9/1991 | Burnham | |
| 5,088,785 A * | 2/1992 | Lee | 296/26.05 |
| 5,259,712 A | 11/1993 | Wayne | |
| 5,415,506 A | 5/1995 | Payne | |
| 5,678,876 A | 10/1997 | Sargent | |
| 6,199,929 B1 * | 3/2001 | Hansch | 296/36 |
| 6,206,624 B1 | 3/2001 | Brandenburg | |
| 6,478,356 B1 | 11/2002 | Wayne | |
| 6,629,807 B2 | 10/2003 | Bernardo | |
| 6,974,170 B2 | 12/2005 | Mulvihill | |
| 7,273,336 B2 | 9/2007 | Silamianos | |
| 7,530,627 B2 * | 5/2009 | Brennan | 296/186.4 |
| 7,665,768 B2 * | 2/2010 | Duval | 280/789 |
| 7,708,299 B2 * | 5/2010 | Duval et al. | 280/401 |
| 7,819,464 B2 * | 10/2010 | Haub et al. | 296/186.1 |
| 7,971,919 B2 | 7/2011 | Vertanen | |
| 8,100,615 B1 | 1/2012 | Freeborn | |
| 2003/0034664 A1 | 2/2003 | Wayne | |
| 2007/0296197 A1 * | 12/2007 | Duval | 280/789 |
| 2008/0315608 A1 | 12/2008 | Heller | |
| 2010/0109367 A1 | 5/2010 | Mihalko | |

* cited by examiner

*Primary Examiner* — Gregory Blankenship
(74) *Attorney, Agent, or Firm* — Carrithers Law Office PLLC

(57) ABSTRACT

A bracket kit which enables a user to add upright side boards to a trailer which includes a flat bottom with a metal frame extending upward from the sides of the trailer. The bracket kit includes four brackets which are quickly and easily connected to the trailer frame and which include vertical channels into which uprights sideboards are inserted. The upright boards are held in place by the brackets and enable the trailer to contain and haul loose particulate matter such as mulch, sand, gravel or the like.

15 Claims, 4 Drawing Sheets

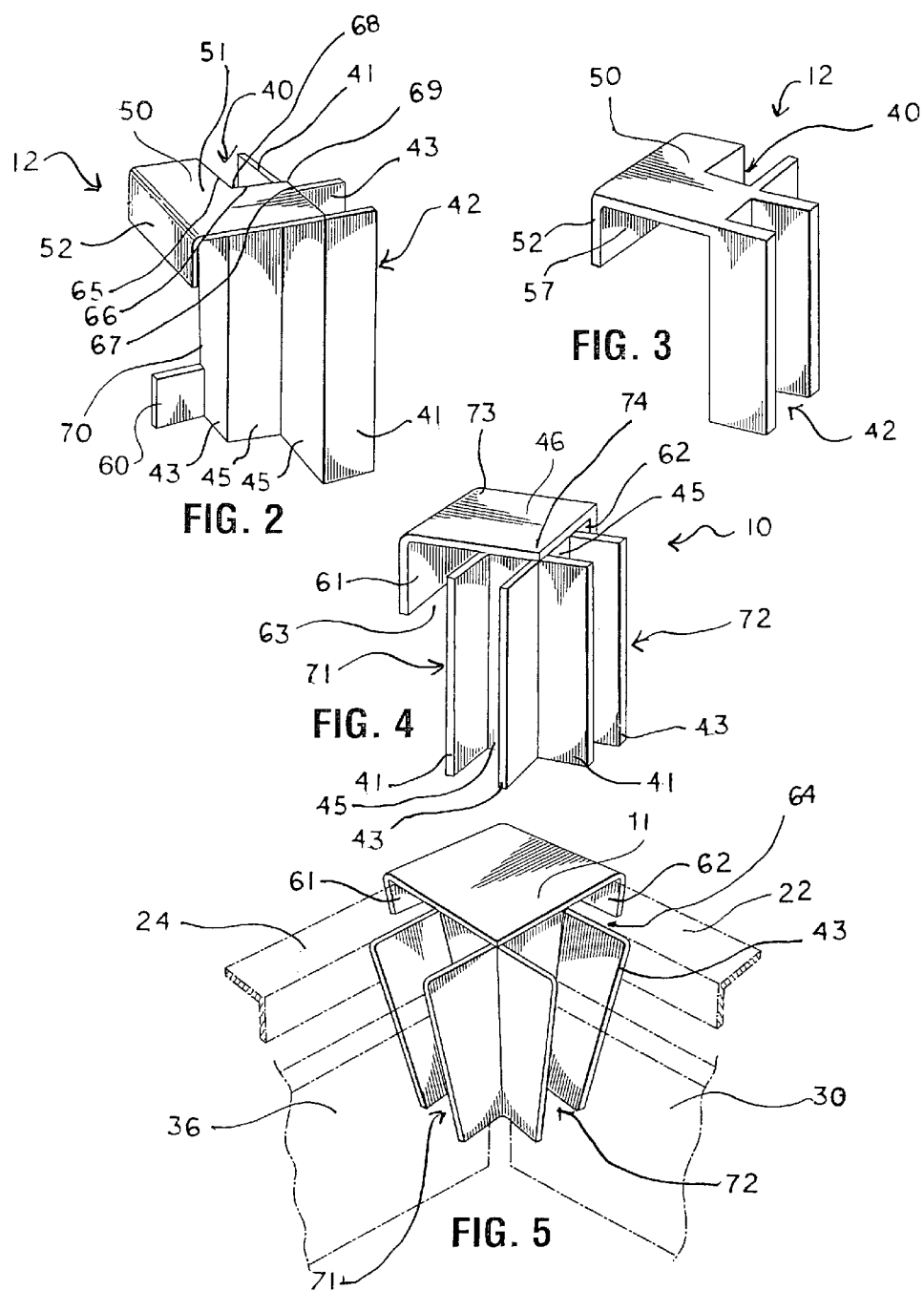

TRAILER SIDE BOARD SUPPORT BRACKETS

CROSS REFERENCES TO RELATED APPLICATIONS

This application claims priority from Provisional Application Ser. No. 61/851,263 filed on Mar. 4, 2013 and is incorporated by reference herein in its entirety.

TECHNICAL FIELD

The present invention relates to the field of brackets which can be dropped in place on a trailer frame enabling the user to slide board members into channels in the brackets thus modifying the trailer for carrying particulate matter such as gravel, mulch, leaves and so on.

BACKGROUND OF THE INVENTION

Pickups and small trucks are widely used for carrying loose particulate matter such as gravel, mulch, leaves, and the like. Such vehicles have a solid floor and solid sides, that is, sides which contain no holes. A solid floor and sides is absolutely required when hauling such loads. Otherwise, some of the particulate matter will be lost through holes or voids in a floor or sidewall.

Also common in the art are trailers which allow a user to carry a large load without dedicating a vehicle to that load. For instance, suppose an individual wants to haul a large amount of gravel to his home but wants to unload the gravel at a more convenient time. Rather than hauling the gravel in a pickup, he chooses to pull a trailer behind his pickup, carry the gravel home in the trailer and unload it on a later date. However, there is a problem. The trailer has a solid floor but only has a safety frame around three sides. In order to carry a large amount of gravel, side walls must be built and attached around the frame.

DESCRIPTION OF THE RELATED ART

US Patent Application Publication No. 20030034664 by Wayne for CARGO AREA STRUCTURE which published on Feb. 20, 2003 teaches a cargo area structure or liner for insertion into a vehicle such as a pickup, including sidewall structures enabling insertion of an additional wall.

US Patent Application Publication No. 20080315608 by Heller for VEHICLE LOAD-CARRYING BED SYSTEM HAVING BED DIVIDER which published on Dec. 25, 2008 teaches a load carrying system including a floor, a front wall, and a rear gate wall. The side walls include structure for easy and quick adding of a divider wall extending form one side wall to the other side wall.

U.S. Pat. No. 7,971,919 by Vertanen for CARGO BED INSERT FOR UTILITY VEHICLE, FRONT END MOUNTING ASSEMBLY, AND OPTIONAL ACCESSORIES ITEMS FOR USE THEREWITH, ALONG WITH UTILITY VEHICLE INCORPORATING THE SAME which issued on Jul. 5, 2011 teaches a cargo carrying bed including a floor and two side walls. The side walls include notches allowing addition of cross walls or dividers between the side walls and for structural support members extending above and beyond the side walls.

US Patent Application Publication No. 20100109367 by Mihalko for PAYLOAD DIVIDER SUPPORT ARMATURE which published on May 6, 2010 teaches a partition support member for use on an existing cargo bed. The partition support member includes a standard to be inserted into an existing side wall pocket on the cargo bed or a box metal member to be impaled over an existing standard on the bed. The partition support member also includes a channel for insertion of a divider or cross wall member.

SUMMARY OF THE INVENTION

The present invention provides a bracket kit which enables a user to add four upright side boards to a trailer which includes a flat bottom with a metal frame extending upward from the outer edges of the trailer. The trailer is configured to be towed by a small truck such as a pick-up truck. The bracket kit includes four brackets which are quickly and easily connected to the trailer frame and which include vertical channels into which uprights sideboards are inserted. The upright boards are held in place by the brackets and enable the trailer to contain and haul loose particulate matter such as mulch, sand, gravel or the like. No tools are required to connect the brackets to the trailer frame because the brackets are configured to slip down over the upper portion of the trailer frame and thereby cooperatively interlock with the frame.

One preferred embodiment of the present invention includes a trailer side board support bracket kit comprises, consists essentially of, and/or consists of a pair of front corner brackets and a pair of rear corner brackets for interconnecting a right side rail 20, a front rail 22 and a left side rails 24 of a trailer supported by at least a pair of front vertical rail support stake or post at each front corner of the trailer and a pair of rear or medial vertical rail support post positioned at or near the rear of a rail. Each support bracket includes flanges for removably engaging said respective rail and respective vertical post. Each of said brackets including a pair of spaced apart parallel vertical flanges for removably supporting a board therebetween. A removable board can be supported extending between said front brackets, between said rear brackets, between said front bracket and said rear bracket.

Furthermore, the present invention is a removably mounted side board support bracket assembly for use with a peripheral frame extending around a floor of a trailer including a horizontal front rail joining a horizontal left side rail and horizontal right side rail extendin therefrom. The frame is supported above the floor by a plurality of vertical frame members. The bracket assembly includes a left front corner bracket removably interconnecting with said front rail and said side rail and preferably supported above the floor by a top cap resting on a top surface of the front rail and the left side rail. The top cap includes a front cap flange and a side cap flange extending downward at a right angle therefrom for receiving the front rail and the left side rail on an outer edge of the top cap. The left front corner bracket includes an inwardly facing vertical channel member having spaced apart flanges and perpendicular thereto an adjacent rearwardly facing channel member having spaced apart flanges extending from the top cap and spaced apart from the front cap flange and the side cap flange for removably holding a board therebetween. A right front corner bracket removably interconnecting with said front rail and said side rail and preferably supported above the floor by a top cap rests on a top surface of the front rail and the right side rail. The top cap includes a front cap flange and a side cap flange extending downward at a right angle therefrom for receiving the front rail and the right side rail on an outer edge of the top cap. The right front corner bracket includes an inwardly facing vertical channel member having spaced apart flanges and perpendicular thereto an adjacent rearwardly facing channel member having spaced apart flanges extending from the top cap and spaced apart from the front cap flange and the side cap flange for removably holding a board therebetween. A left rear bracket removably interconnecting said left side rail and preferably supported above the floor by a top cap rests on a top surface of the left side rail. The top cap includes an outer cap flange extending downward at a right angle therefrom for cooperatively engaging the side rail on an outside inner edge of the top cap. The left rear bracket includes a forward facing vertical channel member having a pair of spaced apart flanges extending downward therefrom for holding a board therebetween. The forward facing vertical channel member is spaced apart from the outer cap flange for receiving the left side rail therebetween. The top cap includes an inward facing vertical channel member having a pair of spaced apart flanges for holding a board therebetween extending downward therefrom perpendicular and adjacent to the forward facing vertical channel member and spaced apart from the outer cap flange for receiving the left side rail therebetween. The forward facing vertical channel member includes a stop means such as a tab extending outwardly therefrom for cooperative engagement of a vertical frame member. A right rear bracket removably interconnecting said right side rail and preferably supported above the floor by a top cap rests on a top surface of the right side rail. The top cap includes an outer cap flange extending downward at a right angle therefrom for cooperatively engaging the side rail on an outside inner edge of the top cap. The right rear bracket includes a forward facing vertical channel member having a pair of spaced apart flanges extending downward therefrom for holding a board therebetween. The forward facing vertical channel member is spaced apart from the outer cap flange for receiving the right side rail therebetween. The top cap including an inward facing vertical channel member has a pair of spaced apart flanges for holding a board therebetween and extend downward therefrom pendicular and adjacent to the forward facing vertical channel member and s aced a art from the outer cap flange for receiving the right side rail therebetween. The forward facing vertical channel member includes a stop means such as a tab extending outwardly therefrom for cooperative engagement of a vertical frame member.

It is an abject of this invention to provide a kit with four brackets which cooperatively slide down onto and interlock with the fram extending above the outer edges of a trailer without the need of fasteners or tools of any kind.

It is an object of this invention to provide a kit with four brackets which can be connected to the frame extending above the outer edges of a trailer by simply sliding the brackets down over the corners of the frame whereupon the brackets interlock with the frame members.

It is an object of this invention to provide a kit with four brackets which include upright channel members into which side boards can be slipped to form side walls around the flatbed of a trailer.

Other objects, features, and advantages of the invention will be apparent with the following detailed description taken in conjunction with the accompanying drawings showing a preferred embodiment of the invention.

BRIEF DESCRIPTION OF THE DRAWINGS

A better understanding of the present invention will be had upon reference to the following description in conjunction with the accompanying drawings in which like numerals refer to like parts throughout the views wherein:

FIG. 2 is a perspective view of the left rear corner bracket.

FIG. 3 is another perspective view of the left rear corner bracket.

FIG. 4 is a perspective view of a front corner bracket.

FIG. 5 is a perspective view of a front corner bracket connected to a front corner of the trailer frame with side wall boards inserted.

DESCRIPTION OF THE PREFERRED EMBODIMENTS

In accordance with the present invention, there is provided a bracket kit including four brackets which are removably connected to the frame extending above the peripheral edges of a flatbed trailer for supporting four vertical side boards around the peripheral edges of the trailer. The kit includes left front corner bracket 10, a right front corner bracket 11, a left rear bracket 12 and a right rear bracket 14 which are supported on the top surface of the rail, each one including a plurality of plates or flanges to receive the rails of a trailer and removably retaining vertical side boards within the rails of the trailer bed.

Figure 1:
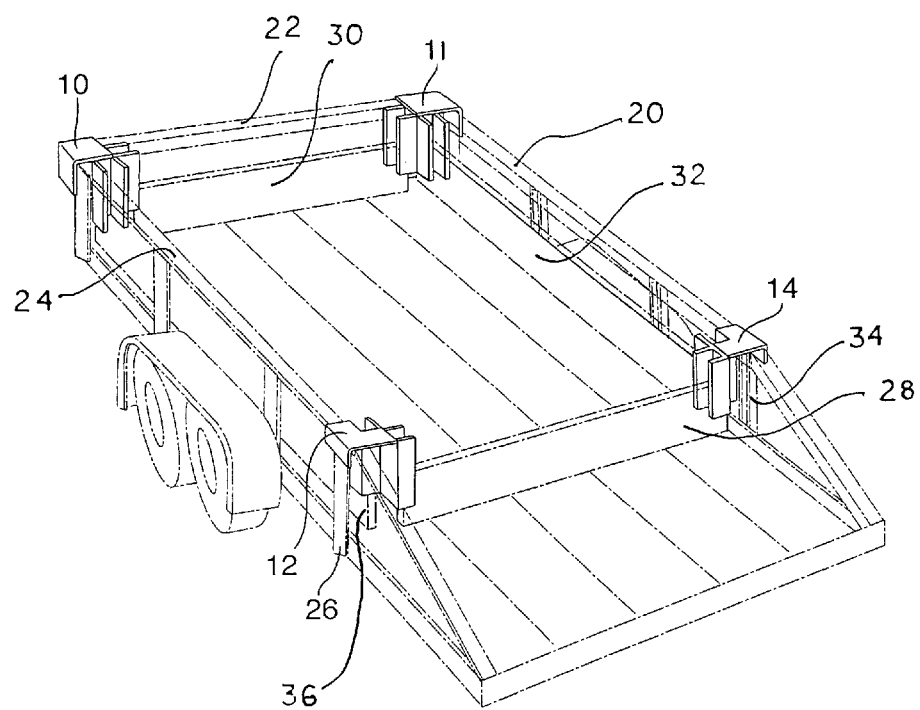
FIG. 1 is a perspective rear view of the bracket kit connected to a trailer having a tubular frame shown in broken lines.

As best shown in FIG. 1, the trailer comprises a generally rectangular frame supported by a suspension with springs, at least one axle, and wheels, having a flat bed thereon typically composed of metal or wood, and a tongue extending from the trailer with a coupling for cooperatively and removably mounting to a hitch on a vehicle. The present invention is made to be used with a trailer including side rails which are typically made of angle iron or tubular metal having short vertical members or stakes extending upward from the frame around the bed of the trailer, with a top rail supported by the stakes extending around the side and front periphery of the trailer bed. In order to hold loose material such as dirt, sand, mulch or the like on the trailer, planks or boards such as 2×8, 2×10, or 2×12 are set against or fastened to these rails by ropes, bolts or the like which provide support therefor and hold the boards on their sides against the rails. The brackets of the present invention provide removal means for holding the boards in position and interlocking them to the trailer side rails to prevent them from falling over and to provide a locking mechanism for securing the boards in position and releasably retaining same.

Figure 8:
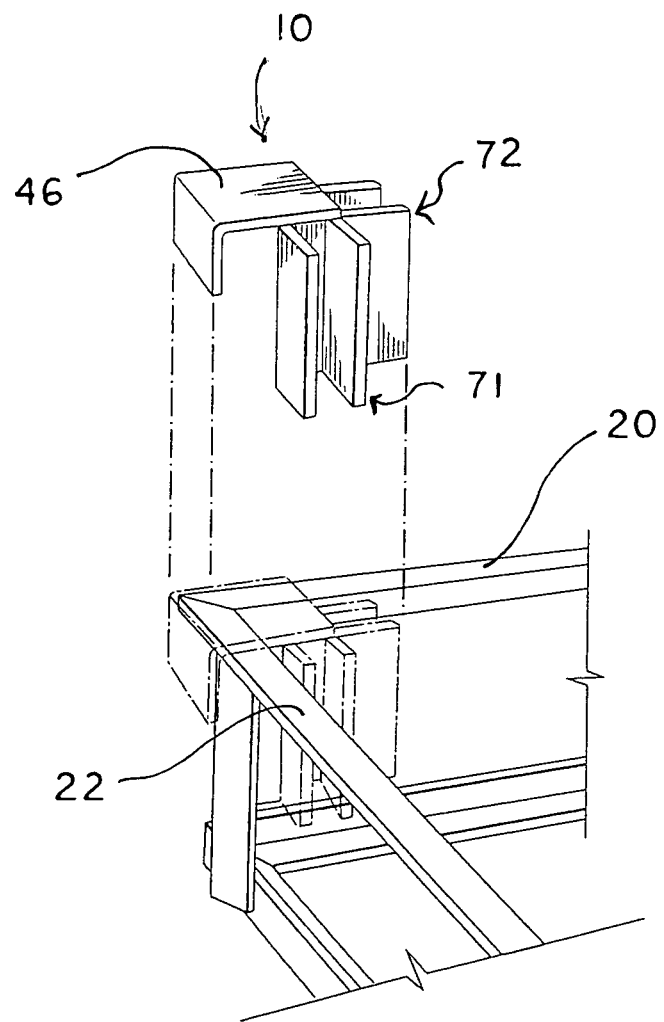
FIG. 8 is a view of a front corner bracket assembled to a front corner of the trailer frame.

The front corner brackets 10, 11 are best shown in FIGS. 1, 5, and 8. Each corner bracket 10, 11 includes two vertical channel members 71 and 72 and a top cap member 46. Channel members 71 and 72 each include two vertical parallel rectangular plates 41 and 43 with their rear vertical edges rigidly connected to the two vertical edges of plate 45 such that a vertical channel is formed between plates 41 and 43. The outside corner formed by rectangular plates 43 and 45 of channel member 71 is rigidly connected to the outside angle formed by rectangular plates 41 and 43 of channel member 72. The top cap member 46 includes a horizontal square plate with two vertical rectangular side plates 61 and 62 rigidly connected to and extending downward from two adjacent peripheral edges of the square plate. The meeting edges of vertical plates 61 and 62 are also rigidly connected together. The corner 74 of the square plate which is opposite of the corner 73 formed by the junction of the two vertical plates 61 and 62 is rigidly connected to the inside corner formed by the top edges of vertical plate 43 of channel member 71 and vertical plate 41 of channel member 72. The vertical channel formed by plates 41 and 43 is preferably wide enough to hold a side wall board which is one and one half inches thick. However, other preferred widths are three quarters of an inch, one inch, two inches and larger.

The horizontal channel 63 is thus formed between the vertical plate 61 and vertical plate 41 of channel member 71. In FIG. 5, frame member 24 passes through this channel 63. Likewise, the channel 64 is formed by the vertical plate 62 and the vertical plate 43 of channel member 72. Again, in FIG. 5, frame member 22 passes through channel 64. The horizontal channels 63 and 64 are preferably large enough to accept a trailer frame member which is two inches wide. It is anticipated that other preferred widths will accept frame members of other selected trailers.

As shown in FIGS. 1, 2, and 3, the rear left bracket includes two vertical channel members 40 and 42, a top cap 50 and a tab 60. The two channel members 40 and 42 are identical to channel members 71 and 72, respectively. The top cap 50 includes a horizontal L-shaped plate 51 and a vertical rectangular plate 52 rigidly connected to and extending downward from the left edge of the L-shaped plate 51. The inside corner 68 of the L-shaped plate 51 is formed by the edge 65 which is parallel to the plate 52 and the edge 66 which is perpendicular to plate 52. The corner 69 is formed by the edge 66 and the edge 67 at the toe of the L-shaped plate 51 which is perpendicular to edge 66.. The corner formed by the top edges of vertical plates 43 and 45 of channel member 40 is rigidly connected to the inside corner 68. The corner formed by top edges of vertical plate 41 of channel member 40 and the vertical plate 45 of channel member 42 is rigidly connected to the corner 69 of L-shaped plate 51.

It can be seen in FIG. 3 that the inside surface of vertical plate 52 and the outside surface of vertical plate 43 of channel member 40 form a horizontal channel 57. The horizontal channel 57 is preferably large enough to accept a trailer frame member which is two inches wide. It is anticipated that other preferred widths will accept frame members of other selected trailers.

Figure 9:
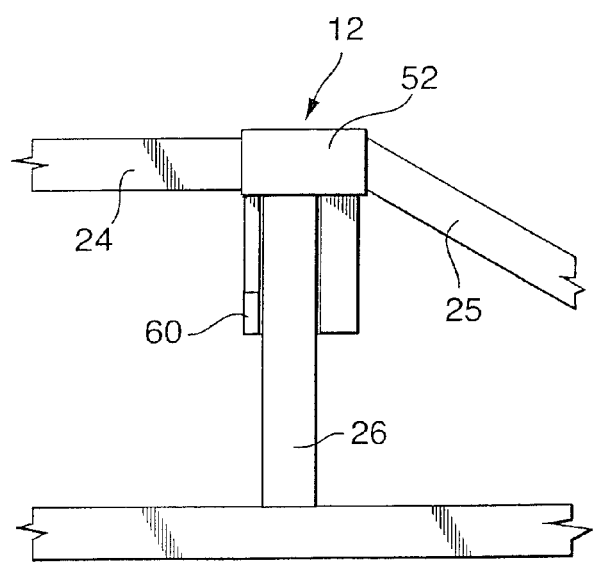
FIG. 9 is a left side view of a rear portion of the trailer showing the purpose of tab 60.

One edge of the square tab 60 is rigidly connected to the bottom of the outer edge 70 of the vertical plate 43 of channel member 40 in such a way that square tab 60 extends perpendicularly from the outer surface of plate 43 of channel member 40. It can be seen in FIGS. 1 and 9 that channel 57 of bracket 12 accepts the rear portion of trailer frame member 24 and the upper portion of frame member 25. Also, to prevent bracket 12 from sliding back further, tab 60 cooperatively engages the front face of vertical frame member 26.

Figures 6, 7:
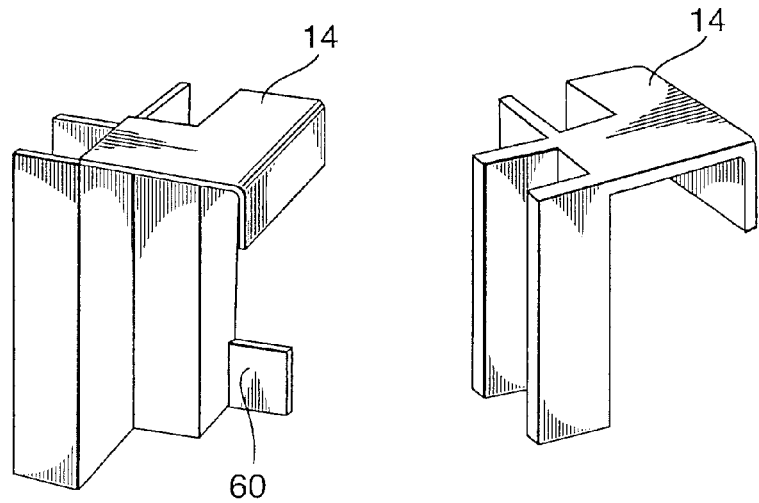
FIG. 6 is a perspective view of the rear corner bracket.
FIG. 7 is another perspective view of the rear corner bracket.

As can be seen in FIGS. 1, 6 and 7, the left rear corner bracket 14 is a mirror image of the right rear corner bracket 12. Further, the tab 60 of right rear corner bracket 14 cooperatively engages the front surface of vertical frame member 34, thus preventing bracket 14 from sliding back.

With the four brackets 10, 11, 12 and 14 connected as shown in FIG. 1, front board 30, right side board 32, left side board 36, and rear board 28 are removably and rigidly held with in the vertical channel members of the four brackets.

The foregoing detailed description is given primarily for clearness of understanding and no unnecessary limitations are to be understood therefrom, for modification will become obvious to those skilled in the art upon reading this disclosure and may be made upon departing from the spirit of the invention and scope of the appended claims. Accordingly, this invention is not intended to be limited by the specific exemplification presented herein above. Rather, what is intended to be covered is within the spirit and scope of the appended claims.

I claim:

1. A removably mounted side board support bracket assembly for use with a peripheral frame extending around a floor of a trailer including a horizontal front rail joining a horizontal left side rail and horizontal right side rail extending therefrom, said frame supported above said floor by a plurality of vertical frame members, said bracket assembly comprising:

a left front corner bracket removably interconnecting with said front rail and said left side rail, including a top cap having a front cap flange and a side cap flange extending downward at a right angle therefrom for receiving said front rail and said left side rail on an outer edge of said top cap, said left front corner bracket including an inwardly facing vertical channel member having spaced apart flanges and perpendicular thereto an adjacent rearwardly facing channel member having spaced apart flanges extending from said top cap and spaced apart from said front cap flange and said side cap flange for removably holding a board therebetween;

a right front corner bracket removably interconnecting with said front rail and said right side rail, including a top cap having a front cap flange and a side cap flange extending downward at a right angle therefrom for receiving said front rail and said right side rail on an outer edge of said top cap, said right front corner bracket including an inwardly facing vertical channel member having spaced apart flanges and perpendicular thereto an adjacent rearwardly facing channel member having spaced apart flanges extending from said top cap and spaced apart from said front cap flange and said side cap flange for removably holding a board therebetween;

a left rear bracket removably interconnecting with said left side rail, including a top cap having an outer cap flange extending downward at a right angle therefrom for cooperatively engaging said side rail on an outside inner edge of said top cap, said left rear bracket including a forward facing vertical channel member having a pair of spaced apart flanges extending downward therefrom for holding a board therebetween, said forward facing vertical channel member spaced apart from said outer cap flange for receiving said left side rail therebetween, said top cap including an inward facing vertical channel member having a pair of spaced apart flanges for holding a board therebetween extending downward therefrom perpendicular and adjacent to said forward facing vertical channel member and spaced apart from said outer cap flange for receiving said left side rail therebetween, said forward facing vertical channel member including a stop means extending outwardly therefrom for cooperative engagement of a vertical frame member; and a right rear bracket removably interconnecting with said right side rail, including a top cap having an outer cap flange extending downward at a right angle therefrom for cooperatively engaging said side rail on an outside inner edge of said top cap, said right rear bracket including a forward facing vertical channel member having a pair of spaced apart flanges extending downward therefrom for holding a board therebetween, said forward facing vertical channel member spaced apart from said outer cap flange for receiving said right side rail therebetween, said top cap including an inward facing vertical channel member having a pair of spaced apart flanges for holding a board therebetween extending downward therefrom perpendicular and adjacent to said forward facing vertical channel member and spaced apart from said outer cap flange for receiving said right side rail therebetween said forward facing vertical channel member including a stop means extending outwardly therefrom for cooperative engagement of a vertical frame member.

2. The bracket assembly of clam 1, wherein said left front corner bracket, said right front corner bracket, said left rear bracket, and said right rear bracket are spaced above said floor of said trailer.

3. The bracket assembly of clam 1, wherein said stop means extending outwardly from said forward facing vertical channel member comprises a tab.

4. The bracket assembly of claim 1, including a board removably connecting said left front corner bracket with said right front corner bracket, a board removably connecting said left front corner bracket with said left rear bracket, a board removably connecting said right front corner bracket with said right rear bracket.

5. The bracket assembly of claim 4 further including a board removably connecting said right rear bracket with said left rear bracket.

6. The bracket assembly of claim 1, wherein said left front corner bracket is removably supported by said top cap resting on a top surface of said front rail and said left side rail.

7. The bracket assembly of claim 1, wherein said right front corner bracket is removably supported by said top cap resting on a top surface of said front rail and said right side rail.

8. The bracket assembly of claim 1, wherein said left rear bracket is removably supported by said top cap resting on a top surface of said left side rail.

9. The bracket assembly of claim 1, wherein said right rear bracket is removably supported by said top cap resting on a top surface of said right side rail.

10. A removably mounted side board support bracket for use with a peripheral frame extending around a floor of a trailer including a horizontal front rail joining a horizontal side rail extending therefrom, said frame supported above said floor by a plurality of vertical frame members, said front side board support bracket, comprising:

a front corner bracket removably interconnecting with said front rail and said side rail including a top cap having a front cap flange and a side cap flange extending downward at a right angle therefrom for receiving said front rail and said side rail on an outer edge of said top cap, said front corner bracket including an inwardly facing vertical channel member having spaced apart flanges and perpendicular thereto an adjacent rearwardly facing channel member having spaced apart flanges extending from said top cap and spaced apart from said front cap flange and said side cap flange for removably holding a board therebetween.

11. The bracket assembly of clam 10, wherein said front corner bracket is spaced above said floor of said trailer.

12. The bracket assembly of claim 10, wherein said front corner bracket is removably supported by said top cap resting on a top surface of said front rail and said side rail.

13. A removably mounted side board support bracket for use with a peripheral frame extending around a floor of a trailer including a horizontal front rail joining a horizontal side rail extending therefrom, said frame supported above said floor by a plurality of vertical frame members, said rear side board support bracket, comprising:

a rear bracket removably interconnecting with said side rail including a top cap having an outer cap flange extending downward at a right angle therefrom for cooperatively engaging said side rail on an outside inner edge of said top cap, said rear bracket including a forward facing vertical channel member having a pair of spaced apart flanges extending downward therefrom for holding a board therebetween, said forward facing vertical channel member spaced apart from said outer cap flange for receiving said side rail therebetween, said top cap including an inward facing vertical channel member having a pair of spaced apart flanges for holding a board therebetween extending downward therefrom perpendicular and adjacent to said forward facing vertical channel member and spaced apart from said outer cap flange for receiving said side rail therebetween, said forward facing vertical channel member including a stop means extending outwardly therefrom for cooperative engagement of a vertical frame member.

14. The bracket assembly of clam 13, wherein said rear bracket is spaced above said floor of said trailer.

15. The bracket assembly of claim 13, wherein said rear bracket is removably supported by said top cap resting on a top surface of said side rail.

* * * * *